(12) United States Patent
Ito et al.

(10) Patent No.: US 11,156,157 B2
(45) Date of Patent: Oct. 26, 2021

(54) COMBUSTION DEVICE AND GAS TURBINE ENGINE SYSTEM

(71) Applicant: IHI Corporation, Tokyo (JP)

(72) Inventors: Shintaro Ito, Tokyo (JP); Soichiro Kato, Tokyo (JP); Masahiro Uchida, Tokyo (JP); Shogo Onishi, Tokyo (JP); Taku Mizutani, Tokyo (JP); Tsukasa Saitou, Tokyo (JP); Toshiro Fujimori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 113 days.

(21) Appl. No.: 16/580,781

(22) Filed: Sep. 24, 2019

(65) Prior Publication Data

US 2020/0032712 A1 Jan. 30, 2020

Related U.S. Application Data

(63) Continuation of application No. PCT/JP2018/011803, filed on Mar. 23, 2018.

(30) Foreign Application Priority Data

Mar. 27, 2017 (JP) .............................. JP2017-060962

(51) Int. Cl.
*F02C 3/20* (2006.01)
*F02C 7/143* (2006.01)
*F02C 3/30* (2006.01)
*F02C 7/14* (2006.01)
*F02C 7/22* (2006.01)
*F02C 3/24* (2006.01)
*F02C 7/141* (2006.01)

(52) U.S. Cl.
CPC ................ *F02C 3/20* (2013.01); *F02C 3/24* (2013.01); *F02C 3/30* (2013.01); *F02C 7/14* (2013.01); *F02C 7/141* (2013.01); *F02C 7/143* (2013.01); *F02C 7/22* (2013.01)

(58) Field of Classification Search
CPC .. F02C 7/14; F02C 7/141; F02C 7/143; F02C 7/16; F02C 7/22; F02C 3/20; F02C 3/22; F02C 3/24; F02C 3/30; F01N 2610/02; F05D 2260/211; F05D 2240/36; F01D 9/065; F01D 5/186
See application file for complete search history.

(56) References Cited

U.S. PATENT DOCUMENTS

| 6,216,443 B1 * | 4/2001 | Utamura ............... F02C 7/08 |
| | | 60/39.53 |
| 6,378,284 B1 | 4/2002 | Utamura |

(Continued)

FOREIGN PATENT DOCUMENTS

| CN | 102562310 A | 7/2012 |
| JP | 02-55835 A | 2/1990 |

(Continued)

*Primary Examiner* — William H Rodriguez
(74) *Attorney, Agent, or Firm* — Rothwell, Figg, Ernst & Manbeck, P.C.

(57) ABSTRACT

The combustion device includes: a compressor that compresses combustion air; a combustor that combusts the compressed combustion air and fuel ammonia; and an ammonia injector that injects the fuel ammonia into the combustion air during or before compression of the combustion air by the compressor and cools the combustion air.

6 Claims, 4 Drawing Sheets

(56) References Cited

U.S. PATENT DOCUMENTS

| | | | |
|---|---|---|---|
| 6,467,252 B1 | 10/2002 | Payling et al. | |
| 6,581,368 B2 | 6/2003 | Utamura | |
| 8,943,826 B2 * | 2/2015 | Kasuga | F01N 3/2066 60/728 |
| 2009/0133400 A1 * | 5/2009 | Callas | F02C 7/143 60/730 |
| 2012/0036825 A1 | 2/2012 | Kasuga et al. | |
| 2012/0047870 A1 * | 3/2012 | Kasuga | F02C 7/22 60/39.462 |
| 2015/0000298 A1 | 1/2015 | McAlister | |
| 2015/0052902 A1 | 2/2015 | Levine | |
| 2016/0376954 A1 * | 12/2016 | Davis, Jr. | F02C 3/30 60/301 |
| 2019/0360397 A1 * | 11/2019 | Ito | F23R 3/36 |
| 2020/0023315 A1 * | 1/2020 | Ito | F02C 3/34 |

FOREIGN PATENT DOCUMENTS

| | | | | |
|---|---|---|---|---|
| JP | H09-173787 A | 7/1997 | | |
| JP | 09-236024 A | 9/1997 | | |
| JP | 10-246127 A | 6/1998 | | |
| JP | 2877098 B2 | 3/1999 | | |
| JP | 2003-530501 A | 10/2003 | | |
| JP | 2012-255420 A | 12/2012 | | |
| JP | 2016-191507 A | 11/2016 | | |
| WO | 2010/082359 A1 | 7/2010 | | |
| WO | WO-2018180781 A1 * | 10/2018 | | F23R 3/40 |

* cited by examiner

COMBUSTION DEVICE AND GAS TURBINE ENGINE SYSTEM

CROSS-REFERENCE TO RELATED APPLICATIONS

This application is a Continuation Application based on International Application No. PCT/JP2018/011803, filed Mar. 23, 2018, which claims priority on Japanese Patent Application No. 2017-060962, filed Mar. 27, 2017, the contents of which are incorporated herein by reference.

TECHNICAL FIELD

The present disclosure relates to a combustion device and a gas turbine engine system.

BACKGROUND

For example, Patent Document 1 discloses a configuration in which in an apparatus such as a gas turbine provided with a compressor, a liquid is sprayed into intake air that is to be supplied to the compressor and thus the temperature of the intake air is decreased. By cooling the intake air to the compressor in this way, it becomes possible to improve the efficiency of the entire system including the apparatus provided with the compressor.

DOCUMENT OF RELATED ART

Patent Document

[Patent Document 1] Japanese Unexamined Patent Application, First Publication No. H9-236024

SUMMARY

Technical Problem

Generally, the liquid to be sprayed into the intake air is water. However, in areas where it is difficult to obtain water, it is difficult to cool the intake air to the compressor by spraying water. Further, even if being able to use water, hard water containing calcium content may cause scale at the inside of the compressor or the like due to long-term spraying of water, thereby causing malfunction of the compressor. Therefore, even in areas where water can be obtained, in areas where hard water is generally used, high costs are required for water treatment to remove, for example, calcium or the like, and thus it is difficult to spray water into the intake air to the compressor.

On the other hand, in recent years, a combustion device that combusts ammonia as fuel has been proposed. In such a combustion device, ammonia stored in a liquid state is vaporized and then the vaporized is supplied to a combustion chamber. Therefore, the energy for vaporizing ammonia is required. However, the use of energy for vaporizing ammonia hinders the improvement in efficiency of the entire system including the combustion device.

The present disclosure is made in view of the above-described circumstances, and an object thereof is, in a combustion device and a gas turbine engine system that combust fuel ammonia as fuel, to cool combustion air without using water, or to reduce the amount of water used for cooling combustion air, and to reduce the amount of energy used to vaporize the fuel ammonia.

Solution to Problem

The present disclosure adopts the following configurations as means to solve the above problems.

A combustion device of a first aspect of the present disclosure includes: a compressor that compresses combustion air; a combustor that combusts the compressed combustion air and fuel ammonia; and an ammonia injector that injects the fuel ammonia into the combustion air during or before compression of the combustion air by the compressor and cools the combustion air.

In the combustion device of the first aspect of the present disclosure, the compressor may include a stator blade and a rotor blade, the stator blade may be provided with an injection hole, and the ammonia injector may be configured to inject the fuel ammonia into the combustion air from the injection hole of the stator blade.

In the combustion device of the first aspect of the present disclosure, the compressor may include a low pressure compressor that compresses the combustion air, a high pressure compressor that further compresses the combustion air compressed by the low pressure compressor, and a duct connecting the low pressure compressor and the high pressure compressor, and the ammonia injector may be configured to inject the fuel ammonia into the combustion air at the duct.

In the combustion device of the first aspect of the present disclosure, the ammonia injector may be configured to inject the fuel ammonia in liquid.

In the combustion device of the first aspect of the present disclosure, the ammonia injector may include a nitrogen oxide density adjuster that adjusts an injection amount of the fuel ammonia and that adjusts a density of nitrogen oxide in combustion gas downstream of the combustor.

A gas turbine engine system of a second aspect of the present disclosure includes the combustion device of the first aspect of the present disclosure.

Effects

According to the present disclosure, combustion air to be used for combustion of fuel ammonia in the combustion chamber is cooled by being injected with the fuel ammonia during or before the compression process.

Therefore, in the present disclosure, the combustion air can be cooled without using water. Even when the cooling of combustion air with water is used in combination, the used amount of water can be reduced. Further, since the fuel ammonia is warmed by the combustion air, the amount of energy required to vaporize the fuel ammonia can be reduced. Therefore, according to the present disclosure, in the combustion device and the gas turbine engine system that combust fuel ammonia as fuel, it is possible to cool combustion air without using water, or to reduce the amount of water used for cooling combustion air, and to reduce the amount of energy used to vaporize the fuel ammonia.

DESCRIPTION OF EMBODIMENTS

Hereinafter, an embodiment of a combustion device and a gas turbine engine system of the present disclosure will be described with reference to the drawings.

Figure 1:
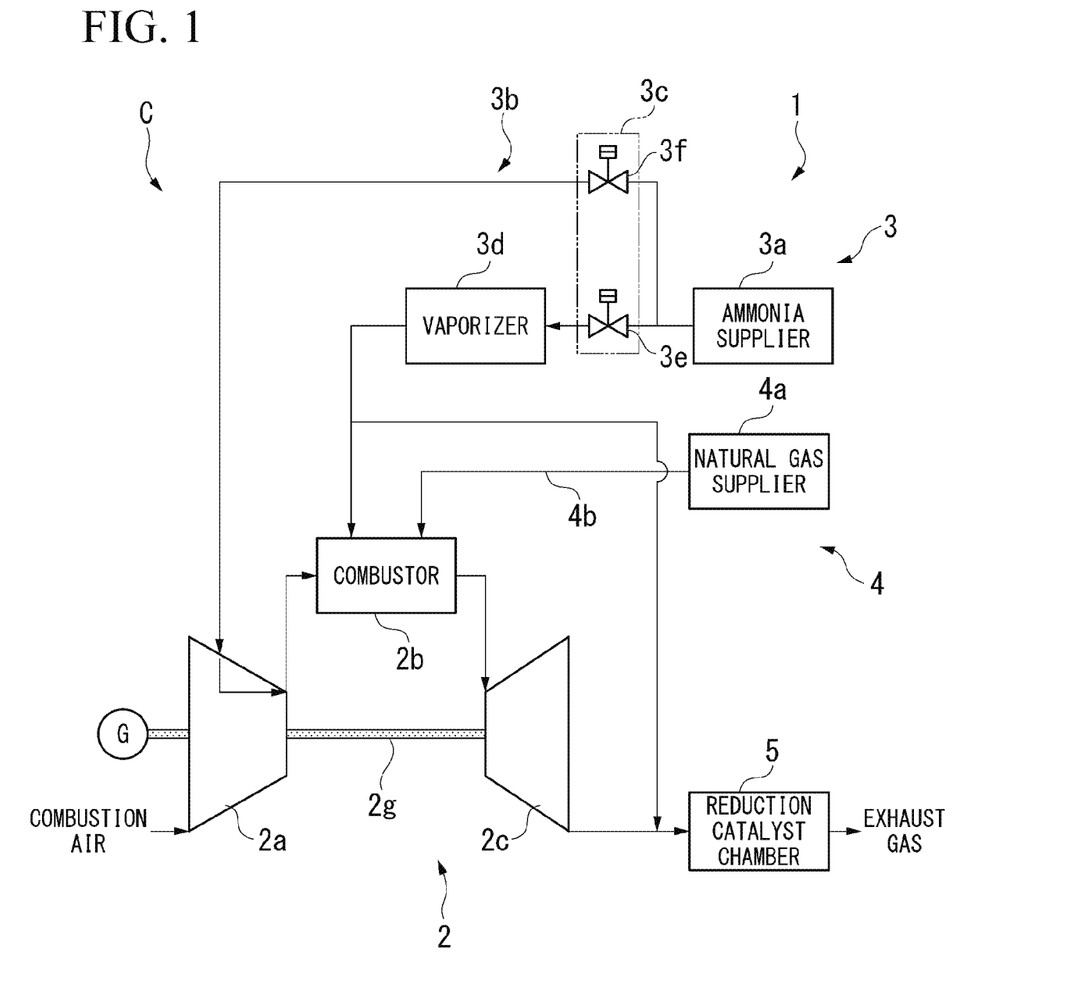
FIG. 1 is a block diagram showing an overall configuration of a gas turbine engine system of an embodiment of the present disclosure.

FIG. 1 is a block diagram showing the overall configuration of a gas turbine engine system 1 of this embodiment. As shown in this drawing, the gas turbine engine system 1 of this embodiment includes a gas turbine engine 2, a fuel ammonia-supplying system 3 (an ammonia injector), a natural gas-supplying system 4 and a reduction catalyst chamber 5. In this embodiment, a compressor 2a and a combustor 2b described later of the gas turbine engine 2, the fuel ammonia-supplying system 3 and the natural gas-supplying system 4 are included in a combustion device C of the present disclosure. The gas turbine engine system 1 is a driving source for a generator G and generates rotational motive power by combusting fuel ammonia using compressed combustion air.

The gas turbine engine 2 includes the compressor 2a, the combustor 2b (a combustion chamber) and a turbine 2c. The compressor 2a compresses combustion air taken in from the outside air to a predetermined pressure and thus produces compressed air. The compressor 2a supplies the produced compressed air to the combustor 2b. The compressor 2a of this embodiment is an axial flow compressor. The compressor 2a and the turbine 2c are connected by a shaft 2g. The upstream side of the compressor 2a in the flow direction of the combustion air may be referred to as a front side, and the downstream side of the compressor 2a in the flow direction may be referred to as a rear side.

Figure 2:
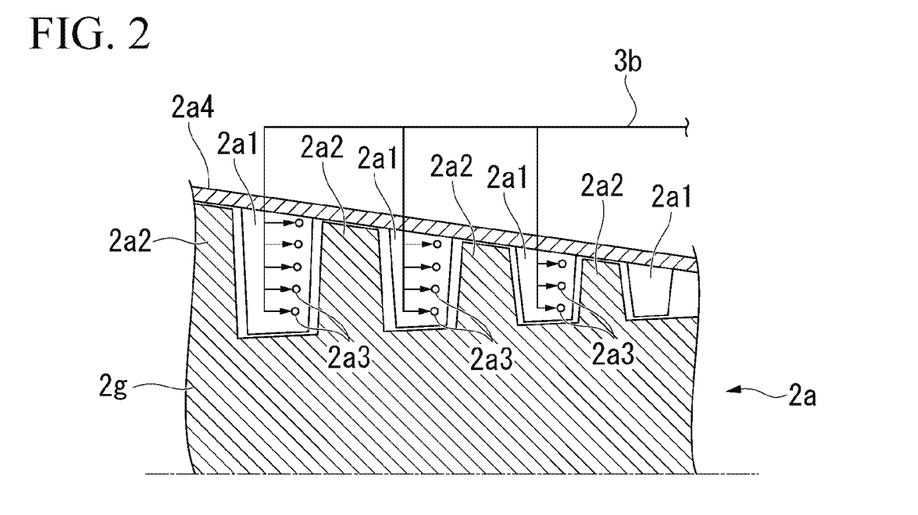
FIG. 2 is a cross-sectional view schematically showing part of a compressor included in the gas turbine engine system of the embodiment of the present disclosure.

FIG. 2 is a cross-sectional view schematically showing part of the compressor 2a. As shown in this drawing, the compressor 2a includes a plurality of stator blades 2a1 that are fixed to a casing 2a4 of the compressor 2a not to move, and a plurality of rotor blades 2a2 that are fixed to the shaft 2g connected to the turbine 2c and are rotational moved around the central axis of the shaft 2g. The stator blades 2a1 are annularly arranged along an inner wall surface (inner surface) of the casing 2a4 around the shaft 2g (in a circumferential direction around the central axis of the shaft 2g) to configure one stator blade row. FIG. 2 shows a configuration in which four rows of the stator blade rows are formed at intervals in a direction (an axial direction) along the central axis of the shaft. The rotor blades 2a2 are annularly arranged on an outer wall surface (outer peripheral surface) of the shaft 2g around the shaft 2g (in the circumferential direction around the central axis of the shaft 2g) to configure one rotor blade row. The rotor blade row is disposed in each of spaces between the stator blade rows adjacent to each other in the axial direction. That is, in the compressor 2a, the stator blade rows and the rotor blade rows are alternately arranged in the direction in which the shaft 2g extends. Further, in this embodiment, the trailing edge-side (the trailing edge, or a portion from which the distance to the trailing edge is less than the distance to the leading edge) of each stator blade 2a1 configuring the stator blade rows other than the stator blade row positioned most downstream in the flow direction of the combustion air is provided with a plurality of injection holes 2a3 that inject fuel ammonia from the inside of the stator blade 2a1 toward the downstream area of the stator blade 2a1. That is, a flow passageway through which fuel ammonia flows is formed inside the stator blade 2a1.

As shown in FIG. 1, the combustor 2b combusts the vaporized fuel ammonia supplied from the fuel ammonia-supplying system 3 using the compressed air produced by the compressor 2a at the inside (the combustion chamber) of the combustor 2b. The combustor 2b supplies combustion gas obtained through such combustion to the turbine 2c. The turbine 2c generates rotational motive power by using the combustion gas supplied from the combustor 2b as driving gas. The turbine 2c is axially connected to the compressor 2a and the generator G and rotationally drives the compressor 2a and the generator G with its own rotational motive power. The turbine 2c discharges combustion gas after power recovery toward the reduction catalyst chamber 5.

The fuel ammonia-supplying system 3 includes an ammonia supplier 3a, a pipe 3b, a distribution mechanism 3c and a vaporizer 3d. The ammonia supplier 3a includes a tank (not shown) that stores liquid fuel ammonia, a pump (not shown) that discharges fuel ammonia stored in the tank, and the like, and delivers a required amount of fuel ammonia toward the combustor 2b under the control of a controller (not shown).

The above controller may be a known computer including a CPU (Central Processing Unit), a RAM (Random Access Memory), a ROM (Read Only Memory) and the like, that can perform predetermined control. The details of the control by the above controller may be defined by software that can be arbitrarily changed or updated by the administrator.

As shown in FIG. 1, the pipe 3b of the fuel ammonia-supplying system 3 is connected to the ammonia supplier 3a, the compressor 2a and the combustor 2b, and has a route that guides fuel ammonia from the ammonia supplier 3a through the vaporizer 3d to the combustor 2b, and a route that guides fuel ammonia from the ammonia supplier 3a to the stator blades 2a1 of the compressor 2a without passing through the vaporizer 3d. The pipe 3b also has another route that branches off the route that guides fuel ammonia from the ammonia supplier 3a through the vaporizer 3d to the combustor 2b, and the other route guides fuel ammonia to an exhaust gas pipe upstream of the reduction catalyst chamber 5.

In this embodiment, the fuel ammonia-supplying system 3 supplies liquid fuel ammonia into the stator blades 2a1 of the compressor 2a using the route of the pipe 3b that guides fuel ammonia from the ammonia supplier 3a to the stator blades 2a1 of the compressor 2a without passing through the vaporizer 3d, and injects the liquid fuel ammonia into a flow passageway for the combustion air from the injection holes 2a3 provided in the stator blades 2a1. That is, the fuel ammonia-supplying system 3 cools the combustion air being in the compression process by the compressor 2a by injecting liquid fuel ammonia into the combustion air during the compression process. In addition, in this embodiment, the fuel ammonia-supplying system 3 injects liquid fuel ammonia into combustion air via the stator blade 2a1 of the compressor 2a.

The distribution mechanism 3c includes a first valve 3e and a second valve 3f. The first valve 3e is disposed on the upstream side of the vaporizer 3d, in an intermediate portion of the route of the pipe 3*b* that guides fuel ammonia to the combustor 2*b* via the vaporizer 3*d*. The opening degree of the first valve 3*e* is adjusted by the controller (not shown), and thus the first valve 3*e* adjusts the supply amount of fuel ammonia delivered from the ammonia supplier 3*a* to the vaporizer 3*d*. The second valve 3*f* is disposed in an intermediate portion of the route of the pipe 3*b* that guides fuel ammonia to the stator blades 2*a*1 of the compressor 2*a* without passing through the vaporizer 3*d*. The opening degree of the second valve 3*f* is adjusted by the controller (not shown), and thus the second valve 3*f* adjusts the supply amount of fuel ammonia delivered from the ammonia supplier 3*a* to the stator blades 2*a*1. The distribution mechanism 3*c* distributes part of fuel ammonia to be supplied to the combustor 2*b* to the stator blades 2*a*1 according to the opening degrees of the first valve 3*e* and the second valve 3*f*.

The vaporizer 3*d* vaporizes the liquid fuel ammonia supplied from the ammonia supplier 3*a* through the first valve 3*e* to produce gaseous fuel ammonia. The fuel ammonia produced by the vaporizer 3*d* is supplied to the combustor 2*b* and partly supplied to the reduction catalyst chamber 5 through the pipe 3*b*.

The natural gas-supplying system 4 includes a natural gas supplier 4*a* and a pipe 4*b*. The natural gas supplier 4*a* includes a tank (not shown) that stores liquefied natural gas, a pump (not shown) that discharges liquefied natural gas stored in the tank, a vaporizer (not shown) that vaporizes liquefied natural gas, and the like. The natural gas supplier 4*a* delivers a predetermined amount of natural gas toward the combustor 2*b* under the control of the controller (not shown). The pipe 4*b* is connected to the natural gas supplier 4*a* and the combustor 2*b*, and guides, to the combustor 2*b*, the natural gas delivered from the natural gas supplier 4*a*.

The inside of the reduction catalyst chamber 5 is filled with a reduction catalyst, and the reduction catalyst chamber 5 reduces the nitrogen oxide (NOx) contained in the combustion gas to nitrogen ($N_2$) by reduction treatment. The reduction catalyst chamber 5 reduces the nitrogen oxide (NOx) by cooperation of the reduction catalyst housed thereinside and the fuel ammonia supplied through the pipe 3*b* of the fuel ammonia-supplying system 3. Note that the fuel ammonia supplied to the reduction catalyst chamber 5 is not used as fuel but is consumed as ammonia for reduction.

An example of the operation of the gas turbine engine system 1 of this embodiment will be described.

For example, when the gas turbine engine system 1 is started from the stopped state, natural gas is supplied from the natural gas-supplying system 4 to the combustor 2*b*. The natural gas supplied to the combustor 2*b* is mixed with air in the combustor 2*b* and combusts by being ignited by an ignition device (not shown). When combustion gas produced by combustion of natural gas is supplied to the turbine 2*c*, rotational motive power is generated, and thus the compressor 2*a* is driven. When the compressor 2*a* is driven, compressed air is produced in the compressor 2*a*, and the compressed air is supplied to the combustor 2*b*, whereby the combustion of natural gas in the combustor 2*b* is promoted. Thereby, the gas turbine engine system 1 is started. Note that the gas turbine engine system 1 may be configured to start by supplying fuel ammonia to the combustor 2*b* from the fuel ammonia-supplying system 3 through the vaporizer 3*d* instead of or together with natural gas.

When the gas turbine engine system 1 is started, a required amount of fuel ammonia is supplied to the combustor 2*b* from the fuel ammonia-supplying system 3 instead of or together with natural gas under the control of the controller (not shown). Part of the liquid fuel ammonia delivered from the ammonia supplier 3*a* is vaporized through the compressor 2*a* and then is supplied to the combustor 2*b* together with compressed air. The rest of the liquid fuel ammonia delivered from the ammonia supplier 3*a* is vaporized by the vaporizer 3*d* and then is supplied to the combustor 2*b*. The fuel ammonia supplied to the combustor 2*b* combusts together with compressed air. Then, combustion gas produced by combustion of fuel ammonia is supplied to the turbine 2*c*, and the turbine 2*c* generates rotational motive power that drives the compressor 2*a* and the generator G. After the energy of the combustion gas is recovered by the turbine 2*c*, the combustion gas is subject to reduction treatment by the reduction catalyst chamber 5, and then is discharged.

In the gas turbine engine system 1 of this embodiment, the fuel ammonia-supplying system 3 causes liquid fuel ammonia to be injected into the combustion air being in the compression process from the injection holes 2*a*3 provided in the stator blades 2*a*1 of the compressor 2*a*. The fuel ammonia injected in this way has a lower temperature than that of the combustion air in the compression process. Therefore, the combustion air is cooled by being injected with fuel ammonia. Further, in this embodiment, since the injected liquid fuel ammonia is vaporized by the heat of combustion air in the compressor 2*a*, the combustion air can be further cooled by the latent heat of vaporization of the fuel ammonia. The combustion air in the compression process is cooled in this way, so that the energy required for the subsequent compression can be reduced. Note that the fuel ammonia injected into the combustion air is supplied to the combustor 2*b* together with compressed air and is consumed as fuel.

In the gas turbine engine system 1 of this embodiment as described above, combustion air to be used for combustion of fuel ammonia in the combustor 2*b* is cooled by injection of fuel ammonia in the compression process. Therefore, in the gas turbine engine system 1 of this embodiment, the combustion air can be cooled without using water.

Even when cooling of combustion air with water is performed in combination, the used amount of water can be reduced. Since fuel ammonia is warmed and vaporized by heat exchange with combustion air, the amount of energy required to vaporize fuel ammonia can be reduced.

Although water is an inhibitor of combustion in the combustor 2*b*, in this embodiment, since fuel ammonia that becomes fuel in the combustor 2*b* is injected instead of water, the combustion state in the combustor 2*b* can be stabilized. Further, production of scale caused due to adhesion of water can be prevented.

Ammonia has a slower combustion speed than that of natural gas. Therefore, even when compressed air mixed with fuel ammonia is supplied to the combustor 2*b*, the risk of backfire or the like is limited to a lower level than a case where compressed air mixed with natural gas is supplied to the combustor 2*b*.

In the gas turbine engine system 1 of this embodiment, since fuel ammonia is injected into combustion air at the compressor 2*a*, a long distance can be secured from the injection point to the combustor 2*b*.

Therefore, the fuel ammonia is sufficiently mixed with the combustion air before the injected fuel ammonia reaches the combustor 2*b*, areas where the density of fuel ammonia is locally high do not occur in the vicinity of the combustor 2*b* and the combustor 2*b*, and the risk of backfire or the like can be further reduced. Further, since the flow rate of the combustion air is high in the compressor 2*a*, when fuel ammonia is injected at such locations, the injected fuel ammonia is sufficiently mixed with combustion air before the injected fuel ammonia reaches the combustor 2b.

In the gas turbine engine system 1 of this embodiment, since fuel ammonia is injected into combustion air at the compressor 2a, the injected fuel ammonia is compressed together with the combustion air by the compressor 2a. Therefore, a fuel pump provided in the ammonia supplier 3a can be reduced in size.

Some compressed air is used for cooling the shaft 2g connecting the compressor 2a and the turbine 2c, and the like, and flows downstream of the combustor 2b without being supplied to the combustor 2b. Since fuel ammonia mixed with the compressed air is consumed for denitration in the reduction catalyst chamber 5, the fuel ammonia can be prevented from becoming wasted.

Part of compressed air flows downstream of the combustor 2b without being supplied to the combustor 2b, and the fuel ammonia contained in the compressed air is used for denitration. Therefore, by adjusting the injection amount of fuel ammonia into combustion air, the density of the nitrogen oxide downstream of the combustor 2b can be adjusted. That is, a configuration may be adopted in which by causing the distribution mechanism 3c to function as a nitrogen oxide density adjuster of the present disclosure, and by adjusting the injection amount of fuel ammonia into combustion air, the density of the nitrogen oxide in the combustion gas downstream of the combustor 2b is adjusted.

In the gas turbine engine system 1 of this embodiment, the fuel ammonia-supplying system 3 injects fuel ammonia into combustion air via the stator blade 2a1 of the compressor 2a. Therefore, even when a nozzle or the like that injects fuel ammonia is not separately arranged, it is possible to inject fuel ammonia into combustion air. Consequently, an increase in pressure loss by providing the nozzle can be prevented. In addition, the plurality of stator blades 2a1 of the compressor 2a are disposed inside the flow passageway for combustion air. Therefore, by injecting fuel ammonia from the plurality of stator blades 2a1, the fuel ammonia can be uniformly injected into combustion air, thereby limiting unintended temperature unevenness and density unevenness of the fuel ammonia from occurring in the combustion air. The occurrence of the density unevenness is limited in this way, whereby areas where the density of fuel ammonia is locally high do not occur, and the risk of backfire or the like can be further reduced.

In the gas turbine engine system 1 of this embodiment, combustion air is cooled by injecting liquid fuel ammonia, but combustion air can also be cooled by injecting vaporized fuel ammonia. However, by injecting liquid fuel ammonia into combustion air, the combustion air can be cooled using the latent heat of liquefied ammonia, and the overall system efficiency of the gas turbine engine system 1 can be improved.

Hereinbefore, the embodiment of the present disclosure is described with reference to the drawings, but the present disclosure is not limited to the above embodiment. The shapes, combinations and the like of the components described in the above embodiment are merely examples, and various modifications can be adopted based on design requirements and the like within the scope of the present disclosure.

Figure 3:
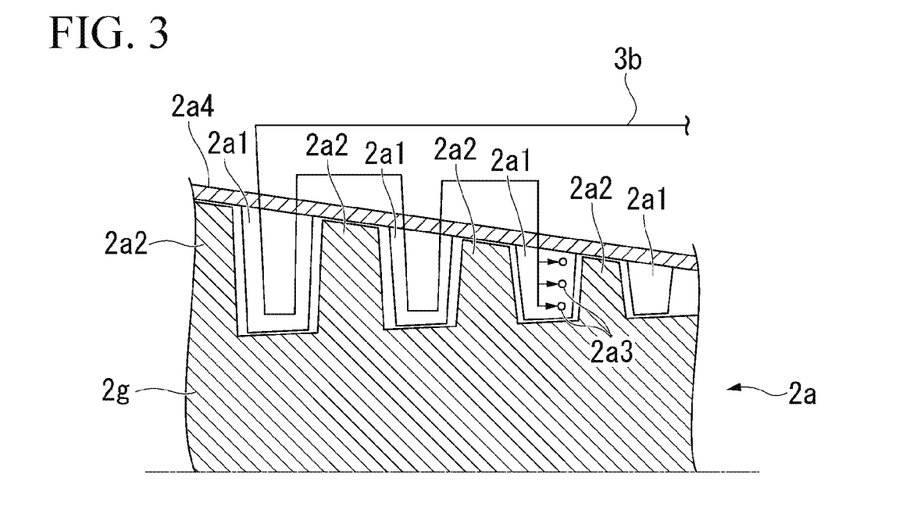
FIG. 3 is a cross-sectional view schematically showing part of a compressor included in a modification of the gas turbine engine system of the embodiment of the present disclosure.

For example, in the above embodiment, all of the stator blades 2a1 into which fuel ammonia is supplied inject the fuel ammonia from the injection holes 2a3 to the outside. That is, in the above embodiment, a configuration is adopted in which all of the stator blades 2a1 except the stator blades 2a1 to which fuel ammonia is not supplied inject fuel ammonia. However, the present disclosure is not limited thereto. For example, as shown in FIG. 3, a configuration may be used in which the injection holes 2a3 are provided only in the stator blades 2a1 configuring one stator blade row, and in which fuel ammonia is supplied into the stator blades 2a1 disposed upstream of the stator blades 2a1 provided with the injection holes 2a3 but is collected without being injected. That is, the stator blades 2a1 different from the stator blades 2a1 provided with the injection holes 2a3 are provided with flow passageways through which fuel ammonia flows, but may be provided with no injection holes. In a case where such a configuration is adopted, in the place where the stator blades 2a1 are disposed where fuel ammonia is supplied but is recovered without being injected, the indirect heat exchange between the combustion air and the fuel ammonia via the stator blades 2a1 is performed. That is, by adopting such a configuration, it is possible to perform both cooling for combustion air by the indirect heat exchange and direct cooling for combustion air by the injection.

Figure 4:
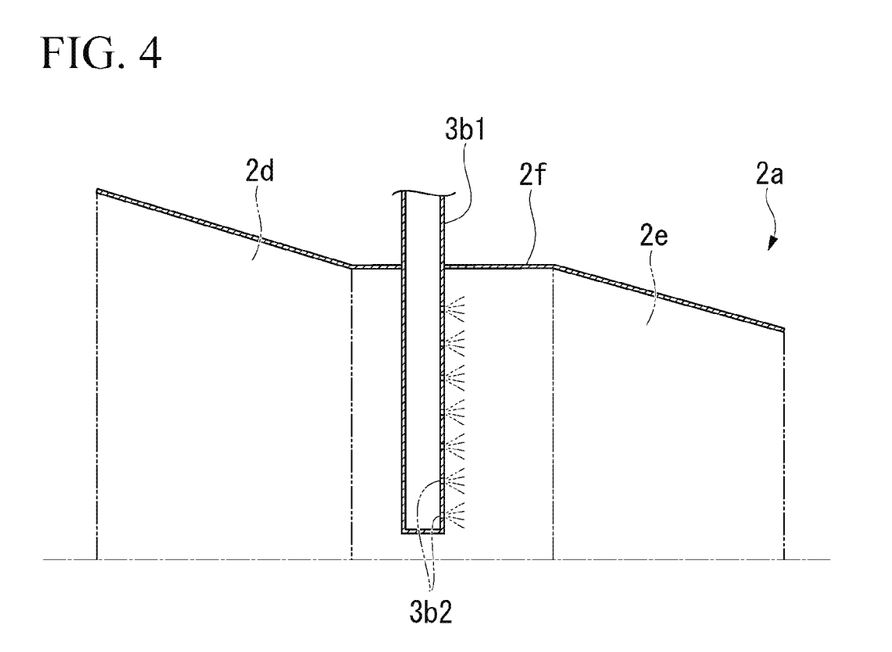
FIG. 4 is a cross-sectional view schematically showing part of a compressor provided in another modification of the gas turbine engine system of the embodiment of the present disclosure.

As shown in FIG. 4, a configuration may be used in which the compressor 2a includes a low pressure compressor 2d that is disposed upstream in the flow direction of combustion air and compresses the combustion air, a high pressure compressor 2e that is disposed downstream of the low pressure compressor 2d in the flow direction the combustion air and further compresses the combustion air, and a duct 2f that connects the low pressure compressor 2d and the high pressure compressor 2e. In such a case, a configuration may be adopted in which the pipe 3b of the fuel ammonia-supplying system 3 is provided with an injection pipe 3b1 inserted into the duct 2f, and in which fuel ammonia is injected from a nozzle hole 3b2 provided in the injection pipe 3b1 into the combustion air that is in the compression process by the compressor 2a. That is, the injection pipe 3b1 of the fuel ammonia-supplying system 3 may be provided in the duct 2f. In this case, the fuel ammonia-supplying system 3 injects fuel ammonia into combustion air in the duct 2f. By adopting such a configuration, it is not necessary to provide an internal flow passageway or the injection hole 2a3 in the stator blade 2a1 of the compressor 2a, so that the structure of the stator blade 2a1 can be simplified.

Figure 5:
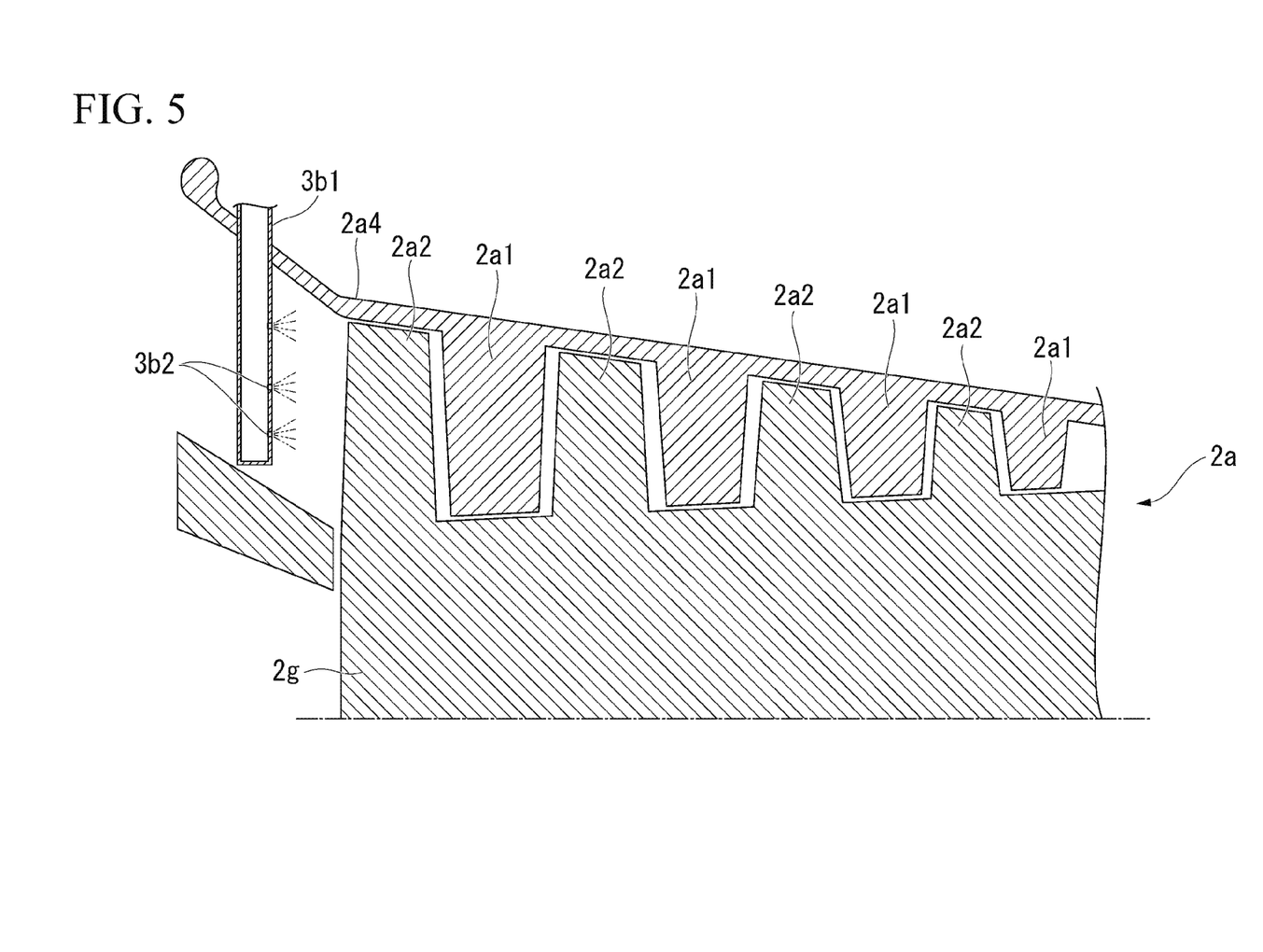
FIG. 5 is a cross-sectional view schematically showing part of a compressor provided in further another modification of the gas turbine engine system of the embodiment of the present disclosure.

As shown in FIG. 5, the injection pipe 3b1 described above may be disposed upstream of the compressor 2a. The temperature of the fuel ammonia immediately after injection is generally much lower than the atmospheric temperature. Therefore, even when fuel ammonia is injected into combustion air before compression by the compressor 2a, it is possible to cool the combustion air and to vaporize liquid fuel ammonia. In a case where such a configuration is adopted, it is also not necessary to provide an internal flow passageway or the injection hole 2a3 in the stator blade 2a1 of the compressor 2a, so that the structure of the stator blade 2a1 can be simplified.

In the above embodiment, an example is described in which the combustion device of the present disclosure is applied to the gas turbine engine system 1. However, the combustion device of the present disclosure can be applied to apparatuses other than the gas turbine engine system 1. For example, if a system (a boiler, an incineration facility or the like) includes a combustion device that mixes compressed air with fuel ammonia and combusts it, the combustion device of the present disclosure can be applied to the system. In such a system, a configuration (a centrifugal compressor, a reciprocating compressor or the like) other than the above axial flow compressor may be adopted for the compressor included in the combustion device of the present disclosure.

In the above embodiment, a configuration is described in which the gas turbine engine system 1 or the combustion device C includes the natural gas-supplying system 4. However, the present disclosure is not limited thereto. If the gas turbine engine system 1 or the combustion device C includes the vaporizer 3d, liquid fuel ammonia can be vaporized to be suitable for combustion in the combustor 2b, and thus a configuration not including the natural gas-supplying system 4 may be adopted.

In the above embodiment, a configuration is described in which not only fuel ammonia but also natural gas can be supplied to the combustor 2b. However, the present disclosure is not limited thereto, and hydrocarbons and other fuels other than natural gas can be used instead of natural gas of the above embodiment.

What is claimed is:

1. A combustion device comprising:
   a compressor that compresses combustion air;
   a combustor that combusts the compressed combustion air and fuel ammonia; and
   an ammonia injector that injects the fuel ammonia into the combustion air during compression of the combustion air by the compressor and cools the combustion air, wherein
   the compressor includes a plurality of stator blades and a plurality of rotor blades,
   the plurality of stator blades include stator blade rows formed at intervals in a flow direction of the combustion air, and each of the stator blade rows is configured of stator blades of the plurality of stator blades that are annularly arranged,
   injection holes are provided in stator blades configuring one of the stator blade rows,
   the ammonia injector is configured to inject the fuel ammonia into the combustion air from the injection holes, and
   other stator blades of the plurality of stator blades, other than the stator blades provided with the injection holes, are positioned upstream of the stator blades provided with the injection holes in the flow direction of the combustion air, the other stator blades include flow passageways through which the fuel ammonia flows, the other stator blades are provided with no injection holes, and the other stator blades are configured such that the fuel ammonia is supplied thereinto and is collected without being injected.

2. The combustion device according to claim 1, wherein the compressor comprises a low pressure compressor that compresses the combustion air, a high pressure compressor that further compresses the combustion air compressed by the low pressure compressor, and a duct connecting the low pressure compressor and the high pressure compressor, and
   the ammonia injector is configured to inject the fuel ammonia into the combustion air at the duct.

3. The combustion device according to claim 1, wherein the ammonia injector is configured to inject the fuel ammonia in liquid.

4. The combustion device according to claim 1, wherein the ammonia injector comprises a nitrogen oxide density adjuster that adjusts an injection amount of the fuel ammonia and that adjusts a density of nitrogen oxide in combustion gas downstream of the combustor.

5. A gas turbine engine system comprising the combustion device according to claim 1.

6. The combustion device according to claim 1, wherein the fuel ammonia is supplied into the other stator blades and is collected from the other stator blades without being injected, and the ammonia injector injects the collected fuel ammonia into the combustion air from the injection holes.

* * * * *